Patented June 5, 1945

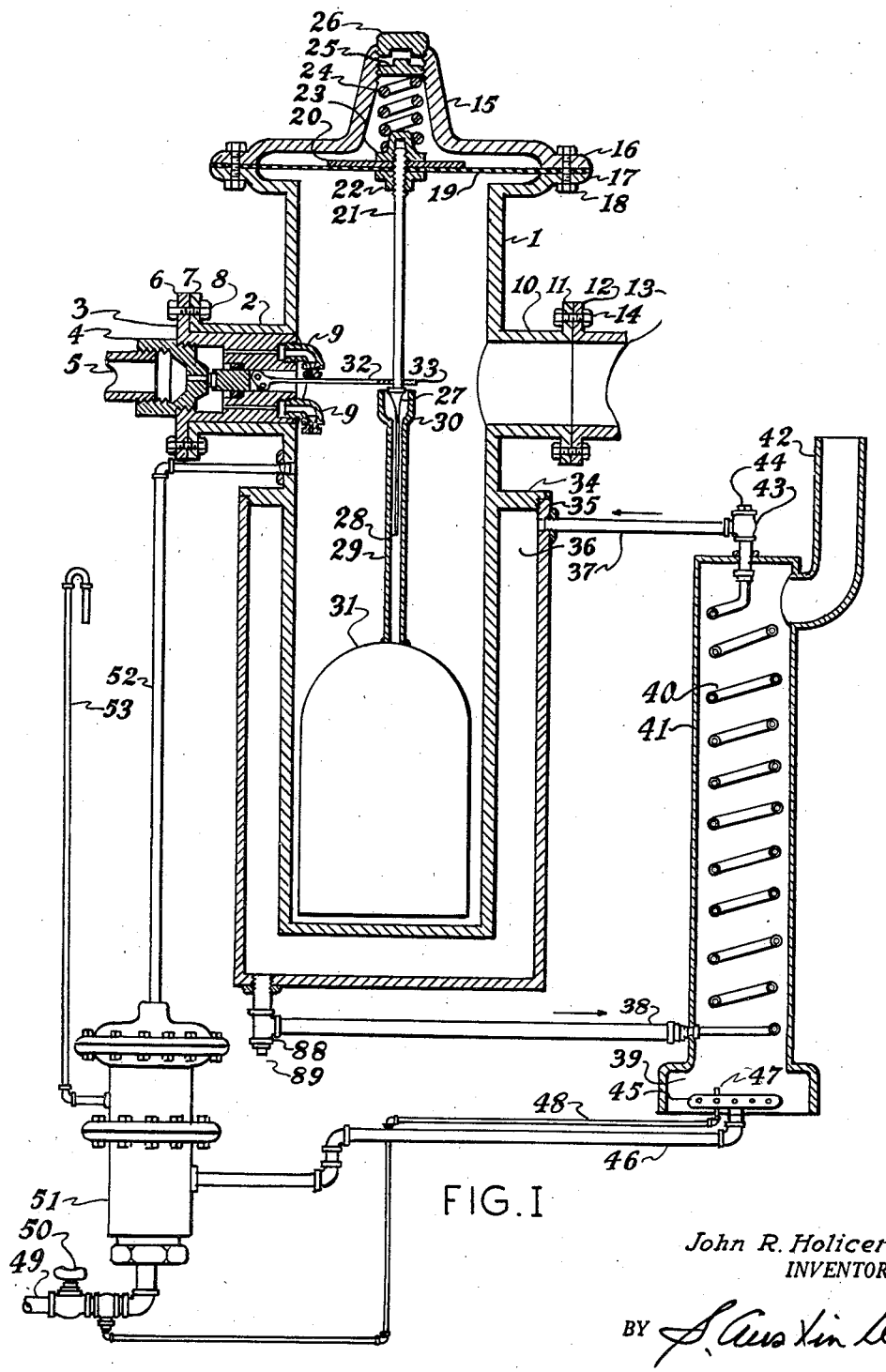

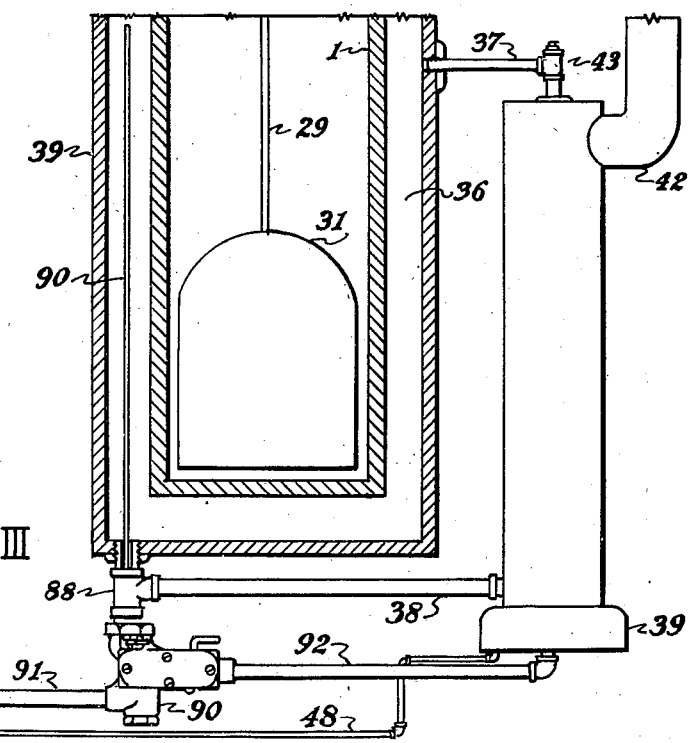
FIG. III
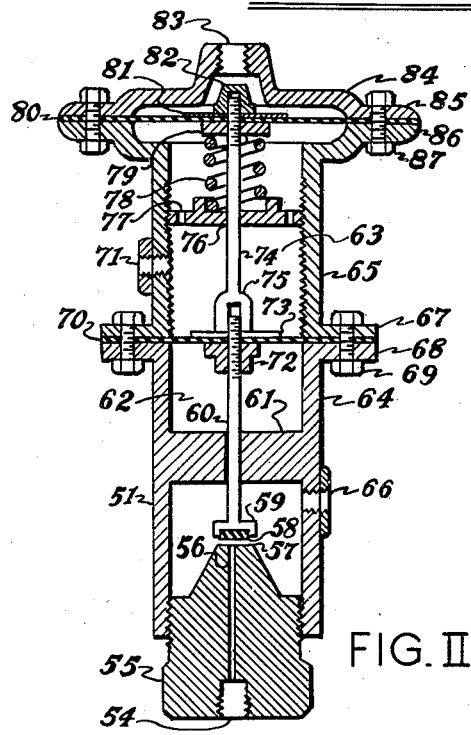
FIG. II
John R. Holicer
INVENTOR.

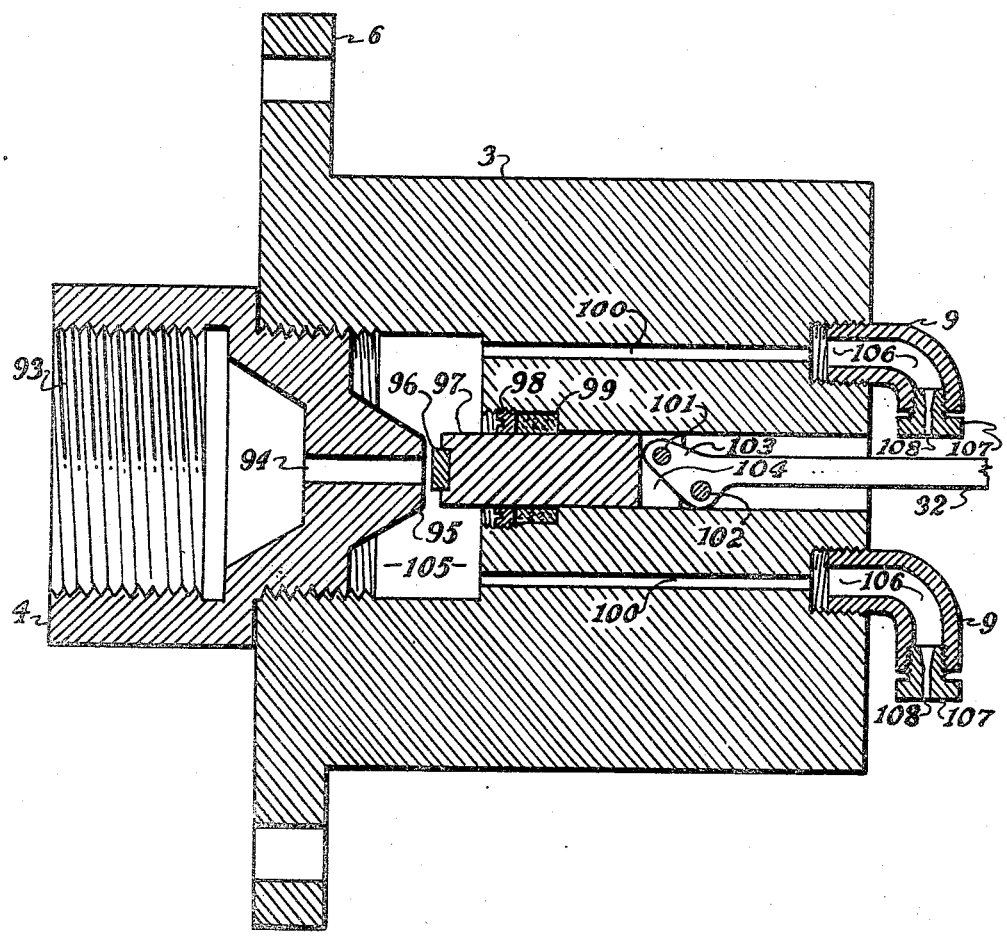
FIG. IV

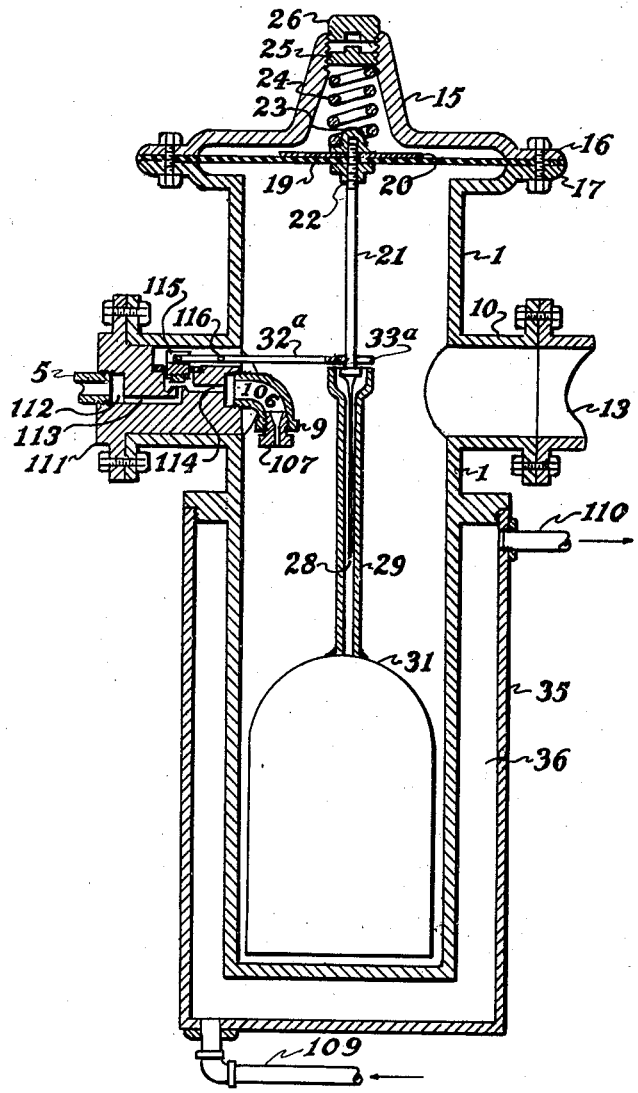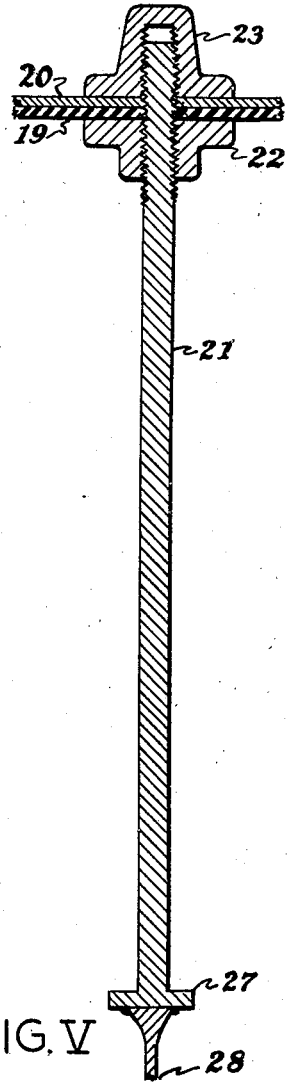
FIG. VI　　FIG. V
John R. Holicer
INVENTOR.

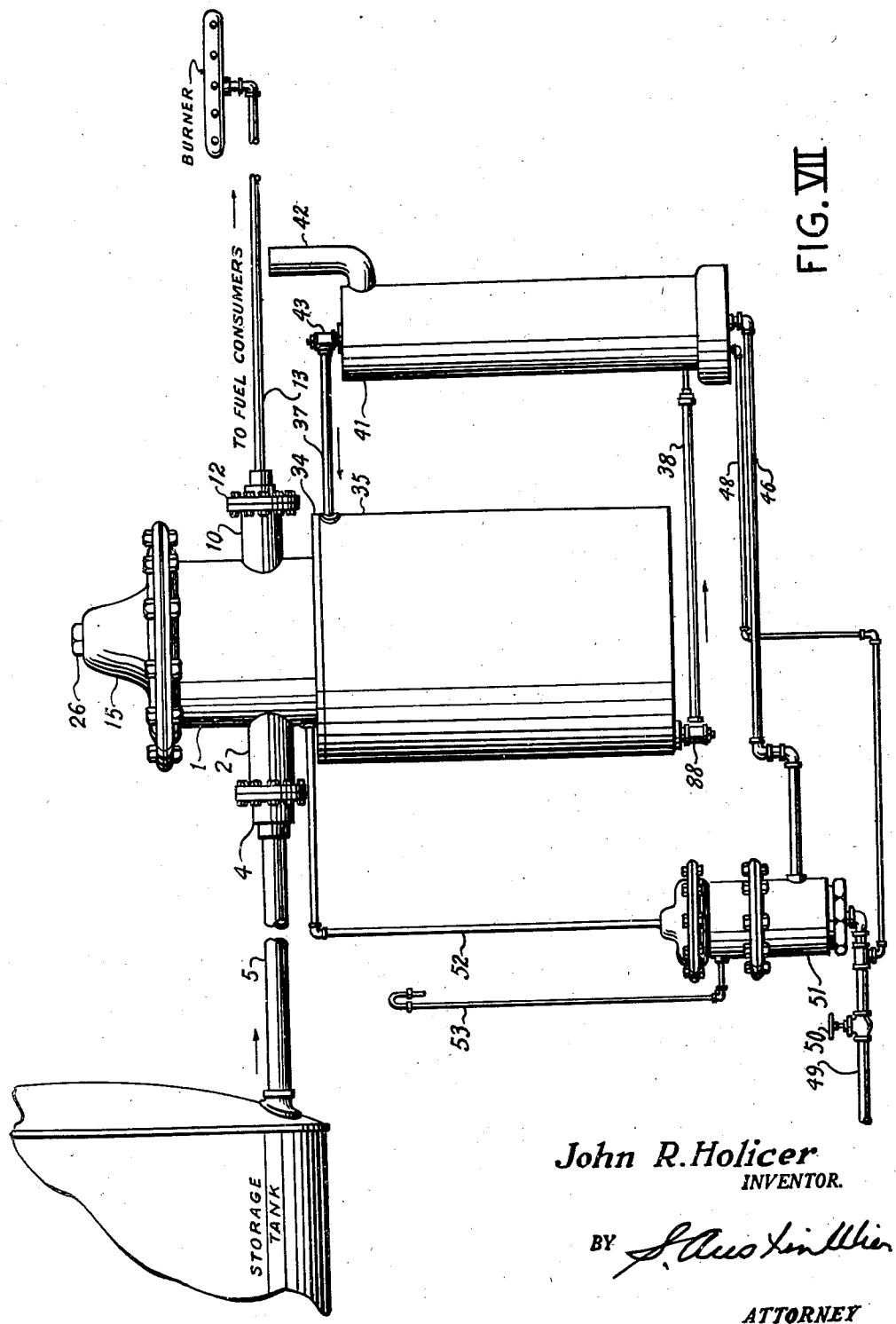

2,377,342

UNITED STATES PATENT OFFICE 2,377,342

METHOD AND APPARATUS FOR TREATING AND GENERATING LIQUEFIED PETROLEUM GAS

John R. Holicer, Shreveport, La.

Application September 2, 1943, Serial No. 501,020

17 Claims. (Cl. 62—1)

This invention has to do with method and apparatus for treating liquefied petroleum gas fuel by expending and atomizing it, reducing its pressure and heating it and converting it into dry gas immediately before it is consumed; and such treatment continues only during the time the gas is being used.

The history of the development of equipment for storing, generating and dispensing butane and similar fuels affords examples of batch systems in which the storage tank itself is subjected to heat and the entire reserve supply of fuel in the tank is heated. They employ a continuous application of heat.

One source of heat has been the earth itself; and latent heat is absorbed by the fuel in the storage tank which is buried in the ground below the frost line.

One objection to such a system is that generation of the liquid into usable gas within this storage container inevitably releases the more volatile elements of the liquid into gas first; and as the tank of fuel is gradually used up pressure is lessened, because the heavier fuel is less volatile and does not so readily respond to heat.

A further objection is to be found in the necessity of continued adjustments of the gas burner which requires more air or oxygen for the complete combustion of the heavier gas than it does for the earlier discharged and lighter gas. Since such an adjustment is not practical for a householder, the result has been that the burners are rarely ever properly adjusted to afford an exactly correct mixture of gas and air. Obnoxious smoke and unnecessary carbon deposits arise from the burner and are deposited about the premises. Also this wasteful method of consuming gas is more expensive than is necessary because of its limited efficiency. The maximum heat content of the fuel is not utilized because of improper combustion resulting from faulty mixtures of gas and oxygen.

The above indicated objections are equally present when there is an artificial application of heat to the storage tank in place of the heat exchange action of the earth itself.

When heat is supplied it is usually in the form of a gas flame consuming some of the gas generated from the tank. It is expensive, because it undertakes to heat the entire content of the tank, although very little of it need be translated into gas and used at any one time. It is also dangerous, because the presence of any flame around a pressure vessel containing any considerable quantity of butane, is dangerous in the extreme; and fires and explosions have been the unhappy result. Extremely costly heat loss is a primary objection to this type of generation.

Occasionally coils of warm or hot water have been passed into and through the combination storage and generating vessel; and such arrangement is expensive and results in a very wasteful loss of heat; besides which, it is dangerous in that a rupture in the coil may force explosive butane into the water system with obvious danger; or water may be injected into the gas system and pipes with resulting annoyance and danger.

Whatever the expedients may be or have been in adding heat to the butane storage and generating system, they are wasteful in the extreme, quite uneconomic and very unsatisfactory.

The variations in the heat content of the gas given off at different times from the combination storage and generating tank is a most serious and well founded objection.

On the other hand, the introduction of liquid butane into a smaller container buried in the earth, or receiving heat from some other source, is attended with the same objectionable results, in that there is an irregular delivery of heat from the gas as the quantum is slowly used up. The "batch system" of generation, or the use of gas from any vessel wherein the liquid is introduced and remains until converted into gas, are unsatisfactory for the reasons indicated.

I have found that the most satisfactory method of treating this fuel is as follows:

A separate container should be employed for storing the liquid fuel; and it should not be the source of supply for generated gas.

The fuel should be withdrawn from this tank in liquid form only, because only in liquid state is there a uniformity of the heat content of the fuel. There is very prevalent the practice of mixing butane with propane or with iso-butane or other of the hydrocarbon derivatives of crude oil which are sufficiently unstable to afford quick generation of usable gas fuel.

These mixed fuels have a uniform B. t. u. content only in liquid state. When they are mixed and then heated together, the lighter fuels arise first in more volatile gases, leaving the heavier ends behind to later afford insufficient pressure and give trouble in combustion.

If these mixed fuels are withdrawn in liquid state to be converted into gas only when and as used, and if the conversion be effected in a separate vessel which is extremely small and in which the fuel is not allowed to accumulate in any quantity in liquid state at one time, then most of the objections indicated above will be obviated.

Furthermore, if this same gas generating chamber is kept at a uniform temperature, just sufficient to effect immediate generation, the result is still more satisfactory.

And if the small and uniformly heated generating chamber is supplied with fuel vapor by expanding and atomizing the liquid immediately before or at the very moment it enters the generating chamber so that it enters as a very fine mist or spray, then, it has been determined, a far less measure of heat need be applied to this generating chamber to effect complete translation of the fuel into dry gas than is the case if this generating chamber is fed with liquid fuel.

Then, in this system the fuel is generated into gas only when, as and if the burners are consuming fuel; and the generating chamber very shortly ceases to generate when the burners are cut off, because automatic means is provided for shutting off the flow of atomized mist, or fuel of any character, to the generating chamber until the consumption demand is again resumed.

Considering the foregoing, it should be made clear that among the objects of this invention are the following:

(a) A method whereby liquefied petroleum gas fuel is educted in liquid state from a storage tank, and then expanded in volume by passing it through an expansion valve, or other means for effecting its expansion, and translating the liquid fuel into a finely divided or atomized mist, and in this state injecting it into a relatively small generating chamber which is kept at a uniform temperature, just sufficient to effect the generation of the fuel into dry gas. And such method of treating and generating the fuel employs a relatively low pressure in the generating chamber; and it utilizes means for preventing the accumulation of liquid within the chamber.

(b) The essence of the method is to be found in the expansion and atomization of the fuel before it is subjected to heat in the gas generating chamber.

(c) Varied apparatus may effect the objects of this method; but an important object therein is the provision of a small gas generating chamber having means associated therewith for maintaining the chamber under relatively low pressure.

(d) A very important object is the provision of an automatic expansion valve which will take a relatively small stream of liquid fuel and expand it into a much larger volume of mist or vapor, so that it may be thereafter introduced into the generating chamber; and the expansion valve may be closed against incoming fuel when the pressure in the chamber reaches a pre-determined pressure.

(e) Likewise an object is to provide means for closing the expansion valve against incoming fuel should liquid accumulate in the gas generating chamber by reason of breakage or failure in the operation of the pressure controller, as no fuel in liquid state is desired in the generating chamber at all.

(f) A further object is to provide heat exchanging apparatus which will keep the generator at the required temperature.

(g) One object is to provide a heat exchanger operated by a very small gas burner to heat and circulate a suitable amount of fluid through a jacket surrounding the generator; and at the same time provide means for cutting off this heat when a pre-determined pressure shall have accumulated in the generator or when a pre-determined temperature shall be attained therein.

(h) A further object is to provide heat exchanging means for utilizing water or other fluid previously heated (apart from the mechanism here shown) and which may be introduced into a heat exchanging jacket around the generator by appropriate inlet and outlet piping.

(i) Another object is to furnish a small gas generating unit for the purpose of supplying dry gas fuel, such as butane, to internal combustion engines. In this case, an extremely small generating unit is used; and it may be heated by water circulated to the heat exchanger arranged thereabout, the water coming from the water jacket of the engine itself. In which case, the same principle of a separate storage tank for keeping a supply of liquid fuel available to be expanded and fed to the generator as a mist or vapor is employed.

In the drawings:

Fig. I shows an elevation of a typical device employing the method here disclosed, in which the generating chamber and its immediately attached mechanism is shown in section.

Fig. II is a sectionalized elevation of the auxiliary pressure-operated automatic fuel control valve.

Fig. III is a partly sectionalized elevation of the lower end of the gas generating chamber, showing a thermostat for the control of heat.

Fig. IV is a sectionalized elevation of one form of the expansion valve, equipped with atomizer nozzles.

Fig. V is an enlarged sectionalized view of the upper end of the control and adjusting rod which is carried in the generating chamber.

Fig. VI is a sectionalized elevation of a typical generating chamber which is heated by the circulation of warm fluid provided from a distant source; and in this view an alternate form of expansion valve is shown.

Fig. VII is a somewhat schematic arrangement of an installation of the apparatus shown in elevation.

The drawings illustrate the method employed, but they by no means show all of the forms of the equipment which may be used to practice this method. They simply show a suitable and preferred form. Likewise, the apparatus itself may be altered in form, construction and disposition and still carry out the objects of this invention.

In the drawings, the principal parts of the apparatus are referred to by numerals; and the numeral 1 indicates the gas generating chamber.

This chamber has an inlet arm 2 through which fuel is introduced to the chamber and in which the expansion and automatic control valve is carried. The body of this valve is indicated as 3.

The valve has a seat-adapter 4 which is removably carried in the exposed end of the valve body; and it is arranged to receive the fuel inlet pipe 5.

The valve body has external flanges 6 which may connect with flange 7 on the inlet arm 2; and these flanges may be held together by bolts 8 so that the valve may be properly mounted. Of course, this valve may be fastened in the chamber wall by threads, or other means, as desired.

Channels leading from the valve body may be fitted at their delivery end with atomizers 9; and one or more atomizers may be used as desired. The atomizer may be turned at an angle to discharge the spray into the generating chamber so as to impart to it turbulence or a swirling motion.

For conducting the dry gas out of the generator the gas outlet arm 10 is provided; and it carries flange 11. A gas service pipe 13 may be connected to this outlet by employing flange 12, and the two flanges may be held in place by bolts 14. Or the gas service pipe may be threaded into the gas discharge opening in the generating chamber.

On the top of the chamber is mounted control head 15, which has flange extensions 16; and the top of the wall of the chamber 1 is extended to form a companion flange 17; and these two flanges may be fitted and held together by bolts 18.

Extending entirely across and sealing the top of chamber 1, and lying between and held in place by these flanges, is diaphragm 19 which carries on its upper surface a somewhat stiffened circular plate 20, down against which the adjusting cap and spring guide 23 may be forced by threading this cap on the upper end of control and adjusting rod 21.

Immediately below the diaphragm there is carried by rod 21 a threaded adjusting nut 22 which may be made up tight against the diaphragm and further seal it and complete the attachment of the rod to the diaphragm.

The top of cap 23 is formed to provide a spring guide which carries compression spring 24; and by regulating the tension of this spring the resistance of the diaphragm to pressure within the chamber is fixed and determined.

Pressure adjusting disc 25 is carried in the housing of control head 15 where it is removably inserted; and it is provided to be turned in the threads which carry it to adjust the spring to the desired tension. The top of the control head is closed with cap 26.

By removing bolts 18 the control head may be taken off, together with the diaphragm, and the entire contents of the generating chamber 1 is open to view and removal and adjustment.

The extent to which rod 21 depends below the diaphragm may be determined and adjusted by the depth to which this rod is screwed into nut 22 and cap 23. Thus the level of the lifting shoulder 27 on rod 21 is determined. It is this shoulder which comes up against lever 23 to close the expansion valve when pressure within the chamber lifts diaphragm 19 to a pre-determined extent.

Rod 21 continues below shoulder 27 in a small rod-like extension 28 which is employed as a guide in the movement of float 31, normally resting on the bottom of chamber 1. Fixed to and above the float is float tube 29 which encases the guide 28 and which terminates in cup 30. This cup is an expanded extension of the tube; and it is designed to avoid striking shoulder 27 to prevent any interference with the pressure actuated movement of rod 21.

When float 31 is elevated by the undesirable introduction into the chamber of even a small quantity of liquid fuel, the cup 30 lifts against lever 32, and the upward movement of this cup closes the expansion valve 4. The free end of lever 32 is finished in an open slot to form two fork-like fingers 33, one of which lies each side of rod 21. This slot is smaller in width than shoulder 27. Therefore, closure of the expansion valve can be effected by the upward movement of this shoulder or the cup independently and separately.

An extension 34 is provided on the side walls of chamber 1 about midway down the chamber wall or somewhat above this level; and this extension takes the form of a circular band about the chamber. It is threaded to receive the heat exchanger jacket 35 which is so disposed about the chamber as to allow fluid space 36 between its wall and the chamber wall. The jacket is removably attached so that it may be taken off and cleaned, or replaced when damaged or leaking, without having to replace any other part of this vaporizing device.

A fluid intake pipe 37 will conduct water or heated fluid into jacket space 36 where it will surround the lower part of the vaporizing chamber and circulate to be discharged through fluid outlet pipe 38 which is attached to the jacket by using appropriate pipe fittings, including the T 88.

A fluid heater 39 is provided at some convenient location adjacent the generating tank; and it may have therein a heating coil 40 surrounded by a casing 41 which is provided with a vent 42.

The upper end of coil 40 terminates in a filling T 43 having therein a plug 44 which can be removed to supply fluid to the heating coil and into the heat exchanger jacket. Instead of this plug, an open vertical vent pipe could be used, or a safety relief valve installed.

A gas burner 45 is carried below the heating coil; and gas pipe 46 carries gas to the burner. A pilot orifice 47 is provided in connection with the burner; and gas is conducted to the pilot through pipe 48.

A primary gas supply pipe 49, carrying gas cock 50, is provided to supply gas directly to the pilot pipe 48; and also pipe 49 will conduct gas to the pressure-operated automatic fuel control valve 51.

This valve is responsive to the pressure within chamber 1; and communication between the valve and the chamber is provided by fuel pressure control conduit 52.

There are three chambers within valve 51 and they are divided off by diaphragms 70 and 80. In order to allow these diaphragms to work and be sensitive and responsive to the pressure in tank 1, it is necessary to allow the chamber between the diaphragms to communicate directly with the atmosphere; and such communication is provided by atmospheric vent tube 53.

Valve 51 has at its lower end a fuel inlet 54 which enters the top of the valve seat-adapter 55; and this inlet continues into fuel channel 56, which ends in valve seat 57, so that gas may flow into the valve on its way to the burner.

Valve disc 58, which comes to rest on the valve seat to close the valve in response to pressure within chamber 1, and thus cut off the supply of fuel to the burner, is carried by disc holder 59, which is but an enlarged extension of the end of valve stem 60. This stem is guided in its movement by valve stem guide 61 which keeps the stem in alignment with the seat.

The lower chamber of the valve is indicated by numeral 62; and it is that part of the valve disposed below diaphragm 70. The middle valve chamber, which communicates with the atmosphere, is indicated by numeral 63.

The casing of the valve is divided into two parts; the valve base 64 and the valve head 65. They are affixed together by the use of upper flange 67 and lower flange 68 held in place by bolts 69.

Between these flanges is sealing diaphragm 70 which prevents the escape of gas from the valve base except through opening 66, which is the gas outlet opening carrying pipe 46; and yet the use of this diaphragm allows valve stem 60 to be responsive in its movement to the pressure within tank 1.

To carry the atmospheric vent pipe 53 which communicates with the middle chamber 63, there is provided vent outlet 71 in the wall of the valve head 65.

To attach valve stem 60 to diaphragm 70 there is provided valve stem nut 72 which is threaded on the stem immediately below the diaphragm; and just above the diaphragm there is washer 73 which is firmly pressed down on top of the diaphragm by the adjusting cup 75, which is screwed onto the upper end of the valve stem. This adjusting cup is an enlarged extension of the control and adjusting rod 74 which is fastened at its upper end to controller diaphragm 80.

The inside of the lower part of the valve head is threaded to carry the spring adjusting disc 76, which has passages 77 therein so that atmospheric pressure may be maintained on the lower part of diaphragm 80 and on the upper part of diaphragm 70 in equal force.

This spring adjusting disc may be moved up and down within the valve head to compress or regulate control spring 78; and with this disc there is effected proper adjustment of this spring so that a pre-determined pressure on the upper part of diaphragm 80 is necessary to overcome its resistance and cause the downward movement of the control and adjusting rod 74, together with valve stem 60 to close the valve and seal the fuel channel 56, thus to prevent any further fuel flowing to the burner until the pressure within chamber 1 is relieved by the withdrawal of gas therefrom to gas consuming devices which the generating chamber is set up to supply.

The upper end of the spring rests against the rod adjusting nut 79 which connects rod 74 to diaphragm 80 when cap 82 is screwed down over the end of the rod. Above controller diaphragm 80 there is a valve head cover 84 which closes the valve head.

Adjusting rod 74, being threaded on its upper end to receive cap 82 and nut 79, can be extended more or less into the body of the valve to maintain the proper and normal distance and relation between diaphragms 80 and 70. When cap 82 is screwed down to lock and tighten the seal rod 74 as it passes through diaphragm 80, there is provided between the cap and the diaphragm a plate 81 so that the seal will be effective and tight and prevent the escape of gas under pressure which flows from chamber 1 through conduit 52; and thus no gas can escape into middle chamber 63. The provision of plate 81 prevents injury to diaphragm 80 when it is compressed between the nut and the cap to make the seal effective.

Valve head cover 84 has peripheral flange-like extensions 85 which cooperate with similar extensions 86 on the valve head 65 to carry therebetween diaphragm 80. These extensions and the diaphragm may be held in place by bolts 87.

The pressure-operated fuel control valve 51 is an automatic device which instantly shuts off fuel from burner 45 and prevents the further heating of fluid which circulates around the lower end of the chamber 1 in the space 36 provided by encasing the lower end of the chamber in the heat exchanger jacket 35.

The valve remains closed until pressure in chamber 1 is relieved. This relief comes about as a result of consumption of some of the gas. The chamber is extremely small and the consumption of this gas which exerts extra pressure is almost instantaneous. Relief of gas pressure on the top of diaphragm 80 allows spring 78 to extend and instantly open the fuel control valve 51.

It is desirable to maintain only sufficient heat from the burner to warm and circulate fluid in the heat exchanger jacket; but the intermittent cutting off of the fuel to burner 45 can be effected by means other than the use of the pressure-operated valve 51.

For instance, the same result can be brought about by the use of a thermostat. Valve 51 can be eliminated entirely and a thermostat arrangement can be provided, as shown in Fig. III.

In order to install the thermostat, it is only necessary to remove plug 89 from T 88 and insert through this opening the expansion tube of the thermostat so that it extends into the space 36 within the heat exchanger jacket; the thermostat 90, which is an ordinary commercial thermostat of conventional make, replaces entirely the pressure control valve 51.

When the thermostat is used, gas line 91 is provided thereto; and gas from this line will flow through the thermostat and into gas line 92 which will supply the burner; and such flow of gas will continue until the temperature within the heat exchanger jacket rises to a pre-determined extent, whereupon the thermostat 90 will operate instantly to shut off the further flow of gas to the burner, and there will be no further heat introduced into the heat exchanger until there is a lessening of the heat in the fluid within the jacket around the generating chamber 1. This heat is quickly lessened by the generation of more gas in chamber 1 when the householder withdraws gas from this chamber.

When valve 51 is eliminated and conduit 52 is removed the opening at which this conduit enters and through which it communicates with chamber 1 must be plugged, of course, as it will not be needed.

There is no change in the provision of the gas pipe 48 to supply the pilot in either arrangement. This pipe is supplied with gas taken from gas supply pipe 49 before the delivery of gas to either the valve 51 or the thermostat 90.

It must be borne in mind, however, that the purpose of either control mechanism (pressure or temperature) to limit and occasionally cut off the supply of fuel to burner 45 is simply to maintain generating chamber 1 at that temperature which is necessary to effect instant conversion into dry and combustible gas of the expanded and atomized fuel which is injected into this chamber for the sole purpose of generating it immediately before its use and consumption.

Chamber 1 is so very small, as compared with old fashioned vaporizing units, that very little heat is required to maintain this necessary and desired temperature. A further important fact to be always carried in mind is that only a very small measure of heat is needed to translate expanded and atomized butane fuel into dry and combustible gas, as compared to that quantity of heat necessary to vaporize and turn liquid butane into dry gas.

The very essence of this invention is found in the provision for the introduction of expanded and atomized gas into the heated generating chamber 1, and the exclusion therefrom of liquid fuel.

In fact, it is never desirable that any butane fuel in liquid state be introduced into this chamber at all. To prevent such introduction the float 31 is provided, and it cooperates with appropriate mechanism for closing the expansion valve when liquid fuel enters the chamber. This positively prevents the liquid from carrying over into the householder's premises. Likewise it makes absolutely unnecessary any continued exposure of the expanded and atomized fuel to a warm chamber; and it obviates the necessity of a large generating chamber; and it is intended to eliminate the use of a large storage tank within which to generate gas for use, whether the heat for such generation is drawn from the earth or applied to the vessel from some other source.

To supply the circulating heating fluid, which is contained within the heat exchanger surrounding generating chamber 1, it is desirable that a non-freezing fluid be used. Sometimes this generating unit may be installed outside of the householder's building or within a cold basement or in some other place where this fluid might be subjected to freezing temperatures if the entire system were shut down, as, for instance, when the operator or householder closes his establishment for a period. This situation is sometimes found in installations which are seasonal, as in camps, or in office buildings or factories which are shut down over the weekend. However, for continuous use or where installation is within a building or warm basement, or where installations are made in climates where freezing is not experienced, water can be used and heated to warm the generating chamber.

A normal supply of water at proper and sufficient temperature to cause the immediate generation into dry gas of the atomized fuel introduced in chamber 1 may be already available in the premises where this generator is to be installed; and in such case, installation may be provided substantially as shown in Fig. VI, where warm water or other warm fluid circulates, by reason of the fact that it is warm, into intake pipe 109 for supplying the jacket; and from the jacket it may flow away through discharge pipe 110.

Such installation will not require the furnishing of the heater 39, nor the pressure controller valve 51, nor the thermostat 90.

A great many internal combustion engines use butane and similar fuels in their operation. Most of these engines, whether stationary or portable, have a water jacket around the internal combustion engine and heat from the engine is absorbed into the water in this jacket; and the type of generator shown in Fig. VI may be furnished to supply fuel to such an engine. When this is the case, warm water from the water jacket of the engine is allowed to be introduced around the vaporizing chamber 1 through inlet pipe 109 and be discharged therefrom through outlet pipe 110.

This same type of installation can be used on automobiles, trucks, tractors and other automotive vehicles which are powered by butane and similar fuels.

The practical nature of this last observation can be understood in light of the fact that a generating unit of the character here disclosed can be provided for an automobile or truck burning butane; and the installation will be very satisfactory due to the fact that the entire generating unit will be smaller in size than the usual oil filter cartridge carried under the hood of an automobile engine. Such a unit need be no larger than a milk bottle. It is light in weight, inconspicuous and quite effective.

Its effectiveness, in so small a unit, arises from the fact that the liquefied petroleum gas fuel is thoroughly expanded, completely atomized and enormously increased in volume before it is introduced into the generating chamber. When this fuel is thus introduced in the state of a very fine mist, its vaporization into dry gas is startlingly quick.

Whether used around a householder's premises, in factories or commercial buildings, or as an adjunct to an automotive engine, no liquid fuel is treated, expanded, atomized or generated into gas except and until there is an immediate demand for the dry gas fuel which is the product of this device.

There is no reserve supply of already-made dry gas kept on the premises for consumption when this generating unit is used. In fact, none is necessary; and such is not even desirable. Reasons of economy and safety make the fact to be otherwise. Uniformity in the heat content of the dry gas furnished by this generator, further proves the value of this continuous method of gas generation at the time gas is being used, and at no other time; and makes obsolete the earlier practice of storing gas for later use.

When this unit is used, it is no longer necessary to generate dry gas and store it for use. It is no longer necessary to employ a combination fuel storage and gas generating tank. It is no longer necessary (and it is positively undesirable) to keep or allow the introduction of liquid fuel into the generating chamber. The generation of gas in this device, as needed, (and only as needed), is as quick and sure and certain as the transformation of water into steam when a fine and mist-like spray of water strikes a hot stove.

The type of expansion valve used as a part of this equipment is not a factor of great importance except that a valve which will positively expand the liquid fuel into a larger volume and allow its atomization is necessary.

A very effective form of such valve, fitted with atomizer nozzle, is shown in Fig. IV wherein the adapter seat 4 is provided with a threaded opening 93 for receiving the fuel inlet pipe 5.

In this valve there is provided valve seat channel 94 which terminates inwardly in valve seat 95. Plunger disc 96 comes to rest on this seat and closes the valve when the plunger 97 moves against the seat.

To prevent leaking around the plunger, there is provided packing 99 in an enlarged bore around the opening carrying the plunger; and this packing may be compressed and held in place by packing nut 98.

One or more fuel channels 100 may receive the fuel from the primary expansion chamber 105 wherein the fuel is introduced from channel 94 and greatly expanded in volume.

These fuel channels 100 (of which there may be several) deliver the considerably expanded fuel into the atomizer expansion chamber 106, where it is further expanded. This fuel then passes out from atomizer nozzle orifice 108 which is provided in the atomizer nozzle 107, carried by atomizer 9.

When this fuel escapes from orifice 108 it is thoroughly expanded and atomized; and it is in such state that it is readily and instantly transformed into dry gas when it strikes the relatively quite warm walls of generating chamber 1.

Lever 32 will close the valve when it is elevated. There is a lever pin 101 in the plunger and in the lever shoe 103, so that these members articulate to move the plunger when the lever is moved.

There is a fulcrum pin 102 provided in the lever and carried by the valve body. A slot 104 may be provided in the end of the plunger nearest the chamber to carry the lever shoe.

In Fig. VI there is shown an alternate construction of the expansion and control valve; and it is indicated by numeral 111.

In this valve there is a primary expansion chamber 112, and fuel inlet channel 113; and this channel ends in a valve seat which, in this instance, is vertically disposed; and above it is provided a valve plunger 115 carrying a suitable valve disc; and it is loosely pinned to lever 32a with pin 116.

A slotted fork is provided in the free end of this lever; and it shows as 33a. It lifts up in response to the control rod 21 or float tube 29.

A lever fulcrum pin is provided in the lever and the valve body, so that, when the free end of the lever is elevated by the action of pressure within the generating chamber 1, or by the float which rises immediately when a small quantity of liquid appears in the chamber, this valve is closed until the conditions of excess pressure or liquid are relieved. Both of these conditions are relieved by the drawing off of gas from the chamber for consumption.

The fuel inlet channel 114 through which expanded fuel flows toward the vaporizing chamber communicates with the much larger chamber 106 in the atomizer 9; and in this last named chamber a greater expansion is effected. The discharge of the expanded fuel through the orifice in nozzle 107 into the relatively large body of the vaporizing chamber itself completes the process of expansion and atomization of the incoming fuel, and by this process it is so conditioned as to be immediately transformed into dry gas for ready combustion when it strikes the warm walls of the generating chamber.

This invention discloses a continuous process for the treatment of liquid fuel by first expanding and atomizing it and then heating it under low pressure while the end product (which is a dry gas) is being used up; and provides a most satisfactory method for immediately supplying combustible gas of uniform heat content through the use of extremely small and inexpensive generating equipment of very safe character.

The combustible vapor produced by the method and apparatus here disclosed is said to be superheated, because there is applied to the fuel, after it has been transformed from a liquid state into a mist, sufficient heat to vaporize the mist and keep it in a state of vapor in the gas generating chamber; and it is thought proper to define the meaning of the words "superheat" and "superheated." Such terms are used in the sense in which they are ordinarily used in the refrigeration art, i. e., the heat necessary to produce the gas and to maintain the gas vapor above the condensing point of the vapor emanating from the liquid.

I claim:

1. The method of treating and generating liquefied petroleum gas which comprises the expansion of liquid fuel into gaseous mist, the introduction of such mist into a generating chamber, the maintenance of relatively low pressure in the chamber, the circulation of heated fluid about the chamber, and the control of the temperature of the fluid by pressure generated within the chamber.

2. The method of treating and generating liquefied petroleum gas which comprises the expansion of liquid fuel into gaseous mist, the introduction of such mist into a generating chamber, so limiting the introduction of fuel with respect to the withdrawal of fuel as to maintain such a low pressure within the chamber as to permit the introduced fuel to flash into vapor, the circulation of heated fluid about the chamber, and the control of the temperature of the fluid by thermostatic means.

3. The method of satisfying a variable demand for gas from a body of liquefied petroleum fuel, said method comprising expanding said fuel into a mist, introducing such mist into a gas generating zone, applying heat to said zone to convert the mist into gas under pressure, withdrawing gas from said zone in keeping with said demand, controlling the introduction of said mist into said zone by changes in pressure of the gas therein, and so limiting the introduction of fuel into said zone with respect to the withdrawal of the fuel therefrom as to maintain the pressure within said zone at such a low value as to permit the introduced fuel to flash into vapor.

4. The method of satisfying a variable demand for gas from a body of liquefied petroleum fuel, said method comprising expanding said fuel into a mist, introducing such mist into a gas generating zone, applying heat to said zone to convert the mist into gas under pressure, withdrawing gas from said zone in keeping with said demand, controlling both the introduction of said mist into said zone and the application of heat by changes in pressure of the gas therein, and so limiting the introduction of fuel into said zone with respect to the withdrawal of the fuel therefrom as to maintain the pressure within said zone at such a low value as to permit the introduced fuel to flash into vapor.

5. The method of supplying, from a body of liquefied petroleum fuel, a demand on the part of a consuming device for superheated vapor, said method comprising withdrawing fuel in liquid form from said body, spraying said withdrawn fuel in the form of mist into a vapor generating zone, maintaining the temperature of said zone within a predetermined closely restricted range, withdrawing fuel from said zone, and controlling the introduction of fuel into said zone by changes in the pressure of the fuel and the quantity thereof in liquid form in said zone so as to permit the rate and character of the discharge to be such as called for by the demand.

6. The method of satisfying, from a body of liquefied petroleum fuel, a variable demand for dry combustible vapor by fuel consuming devices, said method comprising withdrawing fuel in liquid form from said body, spraying the withdrawn fuel in the form of a mist into a heated vapor generating zone, maintaining sufficient temperature in said zone to convert the mist into vapor, controlling said temperature within a predetermined closely restricted range by changes in the pressure of the fuel within the zone, preventing delivery from the zone of fuel in liquid form, and delivering from the zone only dry combustible vapor.

7. The method of supplying, from a body of liquefied fuel, a demand for dry combustible vapor, said method comprising withdrawing fuel in liquid form from said body, atomizing the withdrawn fuel, spraying the atomized fuel into a vapor generating chamber, circulating a heated medium into contact with wall structure of said chamber in a closed circuit, utilizing the heat of said medium to supply heat to said chamber, and withdrawing the fuel from said chamber in accordance with said demand, the rate of supply of fuel to and the withdrawal of fuel from said chamber and supply of heat thereto being so correlated to the size of the chamber and fluctuations in said demand that the fuel after vaporizing in said chamber remains substantially in such condition until withdrawn from the chamber.

8. The method of supplying fuel consuming apparatus with a combustible vapor from a body of liquefied petroleum fuel, said method comprising causing the combustion of fuel in the consuming apparatus to produce a drop in pressure between said body and said apparatus, causing said drop in pressure to move the fuel in a stream from a point below the liquid level of said body toward the apparatus, atomizing fuel in said stream by said drop in pressure alone, directing the atomized fuel into a zone heated by a medium travelling through a closed circuit, vaporizing the atomized fuel in said zone, withdrawing the fuel therefrom and conducting the same to said apparatus, and causing changes in the rate of consumption to directly vary the rate of the fuel supply to said zone and the amount of heat transferred to the fuel within said zone.

9. In apparatus for generating gas from liquefied petroleum fuel, a gas generating chamber; a removable heat exchanger jacket about the chamber and adapted to transfer heat to the chamber; an expansion valve adapted to receive liquid fuel; and means cooperating with the expansion valve to deliver fuel in the form of mist to the chamber.

10. In apparatus for generating gas from liquefied petroleum fuel, a gas generating chamber; means for heating the chamber; an expansion valve communicating with the chamber; and float-controlled valve-closing means within the chamber constructed and arranged to prevent the accumulation of liquid therein.

11. In apparatus for generating gas from liquefied petroleum fuel, a gas generating chamber; an expansion valve communicating therewith; float means of such displacement and construction as to operate the valve and substantially prevent the accumulation of liquid in the chamber; and a removable heat exchanger jacket adapted to transfer heat to the chamber.

12. In apparatus for generating gas from liquefied petroleum fuel, a gas generating chamber; diaphragm means within the chamber for controlling the pressure therein; means associated with the chamber for circulating heated fluid thereabout; gas-fired means for heating the fluid; and pressure-control means for regulating the operation of the gas fired means responsive to the pressure within the gas generating chamber.

13. In apparatus for generating gas from liquefied petroleum fuel, a gas generating chamber; means within the chamber arranged to substantially prevent the accumulation of liquid therein; means associated with the chamber for circulating heated fluid thereabout; gas-fired means for heating the fluid; and thermostatic means for regulating the operation of the gas fire responsive to the temperature of the circulated fluid.

14. In apparatus for generating gas from liquefied petroleum fuel, a gas generating chamber; an expansion valve adapted to deliver gaseous mist to the chamber; float means within the chamber adapted to close the valve upon the accumulation of liquid in the chamber; a heat exchanger jacket associated with the chamber; and intake and discharge conduits communicating with the jacket and adapted for the circulation of warm fluid about the chamber.

15. In apparatus for generating gas from liquefied petroleum fuel, a gas generating chamber; an expansion valve adapted to deliver gaseous mist to the chamber; pressure-operated means adapted to close the valve upon the increase of pressure within the chamber; a heat exchanger jacket associated with the chamber; and intake and discharge conduits communicating with the jacket and adapted for the circulation of warm fluid about the chamber.

16. In apparatus for generating gas from liquefied peroleum fuel, a gas generating chamber; a heat exchanger vessel partially encasing the chamber; a fluid heater; conduits between the vessel and the heater adapted to circulate fluid therebetween; a gas burner associated with the heater; a gas control valve associated with the burner; diaphragm means for operating the valve; and a conduit between the chamber and the diaphragm adapted to allow the latter to respond to the pressure within the chamber.

17. In apparatus for generating gas from liquefied petroleum fuel, a gas generating chamber; a diaphragm-controlled expansion valve arranged to receive fuel for delivery in increments to the chamber and to be responsive to pressure within the chamber; and atomizer means arranged to receive expanded fuel from the valve and delivery mist into the chamber directed against the chamber walls.

JOHN R. HOLICER.